US011990123B1

(12) United States Patent
Rosser (10) Patent No.: US 11,990,123 B1
(45) Date of Patent: May 21, 2024

(54) AUTOMATED TRAINING OF AI CHATBOTS

(71) Applicant: Roy Rosser, Yardley, PA (US)

(72) Inventor: Roy Rosser, Yardley, PA (US)

( * ) Notice: Subject to any disclaimer, the term of this patent is extended or adjusted under 35 U.S.C. 154(b) by 0 days.

(21) Appl. No.: 18/542,723

(22) Filed: Dec. 17, 2023

Related U.S. Application Data (60) Provisional application No. 63/510,111, filed on Jun. 24, 2023.

(51) Int. Cl.
  *G10L 15/22* (2006.01)
  *G10L 13/08* (2013.01)
  *G10L 15/16* (2006.01)

(52) U.S. Cl.
  CPC ............ *G10L 15/16* (2013.01); *G10L 13/086* (2013.01)

(58) Field of Classification Search
  CPC ............... G10L 15/22; G10L 15/1822; G10L 2015/223; G10L 15/063; G10L 15/16; G10L 13/086; G06F 3/167; G06F 40/35; G06F 40/30; G06F 16/00; G06N 20/00; G06N 3/006; G06N 3/045; G06N 5/025
  See application file for complete search history.

(56) References Cited

U.S. PATENT DOCUMENTS

| | | | |
|---|---|---|---|
| 7,783,486 B2 | 8/2010 | Rosser | |
| 8,499,008 B2 * | 7/2013 | Pennacchiotti | G06N 20/00 707/803 |
| 11,442,775 B1 * | 9/2022 | Yu | G06N 3/063 |
| 11,508,360 B2 * | 11/2022 | Peng | G06F 40/44 |
| 11,539,817 B1 * | 12/2022 | Perez | H04L 67/1012 |
| 11,610,582 B2 * | 3/2023 | Cavallari | G10L 15/26 |
| 11,645,479 B1 * | 5/2023 | Coursey | G06F 40/58 704/9 |
| 11,868,672 B1 * | 1/2024 | Dehkordi | G06F 3/012 |
| 2013/0174034 A1 * | 7/2013 | Brown | G06F 16/951 715/708 |

(Continued)

FOREIGN PATENT DOCUMENTS

KR 102436666 8/2022

OTHER PUBLICATIONS

A.Vaswani et al. "Attention is All You Need", Advances in Neural Information Processing Systems, pp. 5998-6008, 2017, USA.

*Primary Examiner* — Jakieda R Jackson
(74) *Attorney, Agent, or Firm* — RosserIP, LLC; Roy Rosser (57) ABSTRACT

Systems and methods for automatically training an AI request processing system are disclosed. These utilize a request-response AI chatbot implemented with rules-based computer code and which has a functional connection to a generative language AI chatbot. The latter is implemented using an attention-based neural network. On receiving a request, a request/response database is checked. When the request is known and valid, the corresponding response is returned. When the request is not known, or not valid, the request is converted and sent as a prompt to the generative language AI chatbot and a reply received. The reply is converted to a response, stored on the request/response database along with a new validity, and output as the response. In one embodiment, the request is automatically amended before sending as a prompt in order to obtain a tailored reply. In another, the reply is automatically edited to obtain a tailored response.

18 Claims, 4 Drawing Sheets

(56) References Cited

U.S. PATENT DOCUMENTS

| | | | |
|---|---|---|---|
| 2014/0114975 A1* | 4/2014 | Rouat | G06N 5/022 |
| | | | 707/737 |
| 2014/0244712 A1* | 8/2014 | Walters | H04L 67/10 |
| | | | 709/202 |
| 2014/0310002 A1* | 10/2014 | Nitz | G10L 15/1822 |
| | | | 704/270.1 |
| 2015/0185996 A1* | 7/2015 | Brown | G06F 3/167 |
| | | | 715/706 |
| 2016/0071517 A1* | 3/2016 | Beaver | G06F 40/35 |
| | | | 704/9 |
| 2016/0098992 A1* | 4/2016 | Renard | G10L 15/30 |
| | | | 704/275 |
| 2016/0155443 A1* | 6/2016 | Khan | G06F 3/147 |
| | | | 704/275 |
| 2016/0234167 A1* | 8/2016 | Engel | H04L 63/1408 |
| 2017/0140755 A1* | 5/2017 | Andreas | G06F 40/35 |
| 2017/0310613 A1* | 10/2017 | Lalji | H04L 63/083 |
| 2018/0025726 A1* | 1/2018 | Gatti de Bayser | G10L 15/22 |
| | | | 704/257 |
| 2018/0075335 A1* | 3/2018 | Braz | G06F 16/3329 |
| 2018/0131645 A1* | 5/2018 | Magliozzi | G06F 40/30 |
| 2019/0013019 A1* | 1/2019 | Lawrence | G10L 15/1815 |
| 2019/0073197 A1* | 3/2019 | Collins | G06F 8/60 |
| 2019/0180258 A1* | 6/2019 | Amar | H04L 51/02 |
| 2019/0197059 A1* | 6/2019 | Yu | H04W 4/029 |
| 2019/0217206 A1* | 7/2019 | Liu | A63F 13/46 |
| 2019/0243899 A1* | 8/2019 | Yi | G06F 16/00 |
| 2019/0258456 A1* | 8/2019 | Byun | G06F 40/35 |
| 2019/0332400 A1* | 10/2019 | Spoor | G06F 3/013 |
| 2019/0392285 A1* | 12/2019 | Manaharlal Kakkad | |
| | | | H04L 51/02 |
| 2020/0137230 A1* | 4/2020 | Spohrer | G06N 20/00 |
| 2020/0153969 A1* | 5/2020 | Dougherty | G10L 17/06 |
| 2020/0184155 A1* | 6/2020 | Galitsky | G06F 40/279 |
| 2020/0257861 A1* | 8/2020 | Galitsky | G06F 18/22 |
| 2020/0287851 A1* | 9/2020 | Anderson | G06F 40/205 |
| 2020/0327196 A1* | 10/2020 | Sampat | G06N 20/00 |
| 2020/0387550 A1 | 12/2020 | Cappetta | |
| 2020/0401848 A1* | 12/2020 | Liu | H04L 67/14 |
| 2021/0004441 A1* | 1/2021 | Sapugay | G06F 16/3329 |
| 2021/0042800 A1* | 2/2021 | Chandra | G06N 3/08 |
| 2021/0133600 A1* | 5/2021 | Elewitz | G06Q 10/04 |
| 2021/0141799 A1* | 5/2021 | Steedman Henderson | |
| | | | G06N 3/045 |
| 2021/0174016 A1* | 6/2021 | Fox | G06N 3/044 |
| 2022/0318248 A1* | 10/2022 | Liang | G06F 16/90332 |
| 2022/0327208 A1* | 10/2022 | Karr | G06F 12/0246 |
| 2022/0350970 A1* | 11/2022 | Rizk | H04L 51/04 |
| 2022/0405484 A1* | 12/2022 | Kanchibhotla | G06N 5/022 |
| 2023/0092274 A1* | 3/2023 | Rodrigo Cavalin | G06N 3/044 |
| | | | 706/11 |
| 2023/0169959 A1* | 6/2023 | Dhillon | G10L 15/22 |
| | | | 704/270 |
| 2023/0247142 A1* | 8/2023 | Meade | H04M 3/5233 |
| | | | 379/202.01 |
| 2023/0315999 A1* | 10/2023 | Mohammed | G06F 16/345 |
| | | | 704/9 |
| 2023/0359984 A1* | 11/2023 | Ngo | H04L 9/50 |
| 2023/0409839 A1* | 12/2023 | Yarabolu | G06F 40/205 |

\* cited by examiner

AUTOMATED TRAINING OF AI CHATBOTS

CROSS-REFERENCE TO RELATED APPLICATIONS

This US non-provisional patent application is a continuation-in-part of US patent application U.S. Ser. No. 18/354,645 entitled "Automated Training of AI Chatbots" that was filed on Jul. 19, 2023, and which in turn claims priority to US provisional patent application U.S. 63/510,111 entitled "Systems and Methods for Training an AI Chatbot" that was filed on Jun. 24, 2023, the contents of all of which are hereby incorporated by reference in their entirety.

BACKGROUND OF THE INVENTION

(1) Field of the Invention

The invention relates to AI request processing systems, or AI chatbots, and more specifically to systems and methods of implementing and using trainable AI chatbots that incorporate a request-response AI chatbot having access to a generative language AI chatbot.

(2) Description of Related Art

Artificial Intelligence (AI) AI request processing systems, often referred to as AI chatbots, have a long history, dating back to the 1950s. They are essentially software modules that mimic human conversations in that they receive natural language inputs and respond with appropriate natural language outputs.

They are considered to be AI in that they fit the 1956 Cornell conference definition of Artificial Intelligence, i.e., "Making a machine behave in ways that would be called intelligent if a human were so behaving."

Up until about 2015, the AI chatbots that were most successful at mimicking human conversational interactions were typically implemented using rules-based computer code, and typically relied on case-based reasoning and typically incorporated a large request/response database. Such request-response AI chatbots are described in more detail in, for instance, U.S. Pat. No. 7,783,486 issued to R. Rosser et al. on Aug. 24, 2010 entitled "Response generator for mimicking human-computer natural language conversation", the contents of which are hereby incorporated by reference in their entirety.

In November 2022, OpenAI Inc. of San Francisco, CA, made a public release of an AI chatbot called ChatGPT™ that relies on an architecture that is significantly different from traditional request-response AI chatbots. ChatGPT™ is a generative language AI chatbot that makes use of an attention-based neural network that was trained on a large amount of text data. The attention-based neural network in ChatGPT™ proceeds by essentially predicting, given a string of text, what the most probable next token, or word will be. Simple as that concept appears, because of the large amount of data on which the attention-based neural network was trained, ChatGPT™ produces very convincing, grammatically well-formed, and usually appropriate, natural language replies to natural language prompts.

However, a generative language AI chatbot such as ChatGPT™ may be expensive and time consuming to train. Estimates are that training ChatGPT™ on approximately 570 G bytes of data took over a month using more than 1000 NVIDIA GPU's and cost well over $10 million in computer related expenses. It may also be expensive to operate once trained. Estimates are that a query to ChatGPT™ may cost more than ten times as much in computer related expenses as a search on a Google search engine.

A further disadvantage of generative language AI chatbots may be that what is essentially their knowledge is effectively stored in their parameters, i.e., in the weights and biases assigned to the various interconnections of the neural network. ChatGPT™ is said to have 175 billion parameters. If erroneous responses are being generated, there may be no simple way to correct them. In contrast, an erroneous response from a request-response AI chatbot may be corrected by a simple update of one easily located entry of a request/response database.

For cost effective, maintainable AI request processing systems, what is desired are systems that have a performance rivaling that of a generative language AI chatbot, while having running costs and error correction capabilities closer to that of a request-response AI chatbot. It is also desirable that they can be automatically and simply trained and updated. Furthermore, it is desirable that the request-response AI chatbot has a simple but effective way of ensuring that the stored responses remain valid over time.

BRIEF SUMMARY OF THE INVENTION

Inventive systems and methods for automatically training an AI request processing system are disclosed.

In a preferred embodiment, such an automatically trainable AI request processing system may be based on a request-response AI chatbot that may be implemented using only rules-based computer code, but which may have a functional connection to a generative language AI chatbot. The generative language chatbot may, for instance, include a neural network, such as, but not limited to, an attention-based neural network, that may have been trained on a corpus of natural language text.

The automatically trainable AI request processing system of the present invention may function in the following manner. On receiving a request, the request-response AI chatbot may check to see if it is a known request to which it may already have a response that is valid. This may, for instance, be accomplished by checking a functionally connected request/response database. If the request is known and valid, the request-response AI chatbot may obtain the response corresponding to the request and return that as the response.

If, however, the request is determined not to be a known request or to be a known request that is no longer valid, the system may proceed by designating, or converting, the request to be a prompt and sending that prompt to the functionally connected generative language chatbot.

On receiving a reply from the generative language AI chatbot the system may designate, or convert, the reply into a new response. This new response may then be stored on the request/response database along with appropriate validation data, thereby training the request-response AI chatbot. The new response may also then be output as the required response.

Validity may, for instance, be related to the age of the response. Validation of the response may, for instance, be accomplished by associating a validity time limit with each response in the response/request database. As discussed in more detail below, this validity time limit may consist of an expiry date and a degree of incrementation that may be used as part of an incremental data retention strategy. The details of the data retention strategy may, for instance, depend on the type of response being stored.

In a further embodiment of the present invention, the request may be automatically amended before being sent as a prompt to the generative language AI chatbot. The amendment may be intended to tailor a reply to the needs of the AI request processing system. For instance, there may be a preference for relatively short responses that may, for instance, be 50 words or less, or a single paragraph or a single sentence. Alternately, or in addition, the AI request processing system may be tailored to users of a certain cognitive capacity or comprehension such as, but not limited to, having responses suited for a particular age or age range. The request may, therefore, be amended to form a prompt intended to elicit the required form of reply.

In a further embodiment, the reply may, for reasons similar to those just stated, be automatically edited before being designated as, or converted into the response.

In yet another embodiment, the AI request processing system may be an audio activated AI request processing system. This may be accomplished by, for instance, providing functional access to a voice-to-text software module and a text-to-speech software module. Requests in audio form, such as, but not limited to, spoken natural language requests, may then be received, processed, and output as audio outputs, such as, but not limited to, spoken natural language responses.

Therefore, the present invention succeeds in conferring the following, and others not mentioned, desirable and useful benefits and objectives.

It is an object of the present invention to provide cost effective, easily maintained AI request processing systems.

It is another object of the present invention to provide AI request processing systems that have a performance rivaling that of a generative language AI chatbot, while having running costs and error correction capabilities closer to that of a request-response AI chatbot.

Yet another object of the present invention is to provide AI request processing systems that can be automatically and simply trained and updated.

A further object of the present invention is to provide automatically trainable AI request processing systems in which the responses are periodically and systematically checked for validity.

DETAILED DESCRIPTION OF THE INVENTION

The preferred embodiments of the present invention will now be described with reference to the drawings. Identical elements in the various figures are identified, in so far as possible, with the same reference numerals. The embodiments that are described in detail are provided by way of explanation of the present invention, which is not intended to be limited thereto. In fact, those of ordinary skill in the art may appreciate upon reading the present specification and viewing the present drawings that various modifications and variations can be made thereto.

Figure 1:
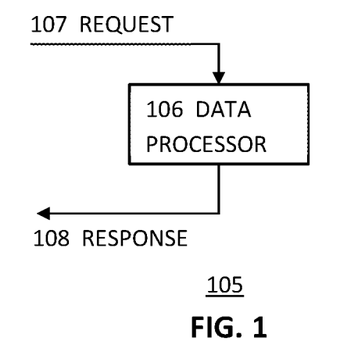
FIG. 1 shows a schematic representation of an AI request processing system.

FIG. 1 shows schematic representation of an AI request processing system 105.

The AI request processing system 105 may have a data processor 106 that may be a combination of hardware and software configured to receive requests 107 and to provide appropriate responses 108 to those requests.

The requests 107 may, for instance, be in a natural language such as, but not limited to, English, Spanish, Mandarin Chinese, Hindi, or Arabic. The requests may be spoken or may be submitted as text or characters. The requests may be converted into a digital form suitable for processing by software modules operating on digital processing hardware.

The responses 108 generated by the data processor 106 may also be in the form of a natural language or it may also be in the form of a suitable computer language, or some combination thereof. The response language may be the same as the request language, or it may be translated into another language. The response may be output as spoken language, or it may be output in text or character form, or some combination thereof.

The responses generated by the data processor may be intended to be reasonably accurate answers to the requests, i.e., a response that may be expected from a reasonably functioning and reasonably informed human. In some embodiments, the responses may be those of a well-informed reasonably functioning human and may incorporate human characteristics such as, but not limited to, humor or irony. In a preferred embodiment, the responses may be one or more well-formed, grammatically correct, natural language sentences.

Figure 2:
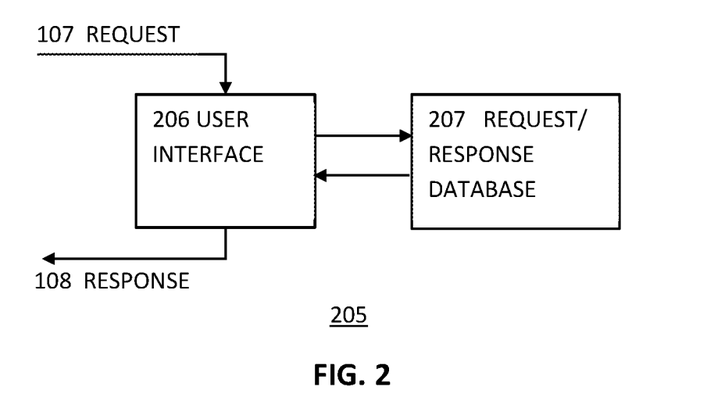
FIG. 2 shows a schematic representation of a request-response AI chatbot.

FIG. 2 shows a schematic representation of a request-response AI chatbot 205.

The request-response AI chatbot 205 may have a user interface 206 that may be capable of receiving requests 107 and returning responses 108. The user interface 206 may be in functional communication with, and control of, a request/response database 207.

The user interface 206 may consist of one or more software modules operating on suitable digital processing hardware. The software modules may be programmed using only conventional rules-based computer code, i.e., the module may be coded using well-known conventional high level computer languages such as, but not limited to, C++, JavaScript, Python, C, or Java, or some combination thereof. The rules-based computer code may, for instance, be implementing a detailed flow diagram that may anticipate all the possible states and data flows that the software modules may be required to implement or perform. The digital processing hardware may, for instance, be digital processors such as, but not limited to, one of the Intel x86 processors, an AMD Ryzen™ processor, an ARM Cortex™ processor, and an NVIDIA GeForce™ GPU or a Qualcomm Snapdragon™, or some combination thereof. (AMD aka Advanced Micro Devices, Inc., is based in Santa Clara, CA; ARM is based in Cambridge, England; NVIDIA Corporation is based in Santa Clara, CA; and Qualcomm Corporation is based in San Diego, CA).

In addition to managing the receipt of requests, the rules-based computer code of the software modules on the user interface 206 may also be structured so as to query and update the functionally connected request/response database 207. The request/response database 207 may also be implemented using only rules-based computer code. The request/response database 207 may, for instance, be a conventional relational database such as, but not limited to, one of MySQL™, an Oracle database and a Microsoft SQL Server, or a NoSQL database such as, but not limited to, a MongoDB™, a Cassandra™ database and a Redis™ database, or it may be a data structure based on a data interchange format such as, but not limited to, JSON, or some combination thereof.

A function of the request/response database 207 may be to store digital representations of requests and their corresponding responses. The database may also store validity attributes associated with the responses such as, but not limited to, validity time limits or expiration dates and indices that may be used to implement an incremental data retention strategy.

The rules-based computer code of the software modules on the user interface 206 may also be structured so as to automatically communicate the appropriate responses obtained from request/response database 207 back to the entity making the request, or on to some other predetermined destination.

Implementations of request-response AI chatbots are well-known and examples are described in more detail in, for instance, U.S. Pat. No. 7,783,486 issued to R. Rosser on Aug. 24, 2010 entitled "Response generator for mimicking human-computer natural language conversation", the contents of which are hereby incorporated by reference in their entirety.

Figure 3:
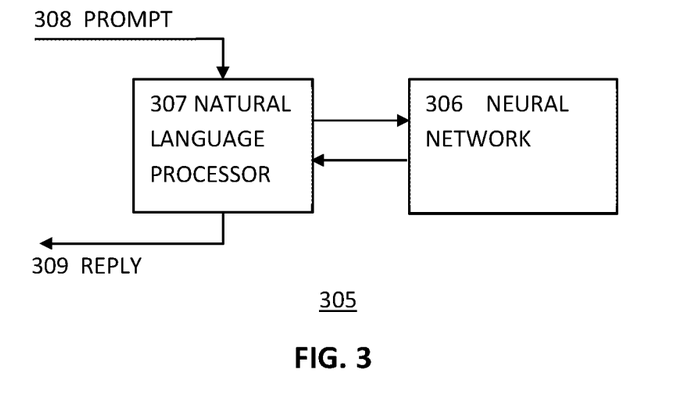
FIG. 3 shows a schematic representation of a generative language AI chatbot.

FIG. 3 shows a schematic representation of a generative language AI chatbot 305.

As shown in FIG. 3, a generative language AI chatbot 305 may consist of a natural language processor 307 in functional communication with a trained attention-based neural network 306. The natural language processor may be implemented using rules-based computer code and may also be programmed to receive prompts from an outside entity and to be able to relay replies back to that entity, or some predefined destination.

The prompts 308 may, for instance, be in the form of natural language text. The natural language processor 307 may receive that text and may convert it into the start of an anticipated reply. The text forming the start of the anticipated reply may then be sent to the trained attention-based neural network 306. The trained attention-based neural network may then complete the anticipated reply by the apparently simple process of repeatedly predicting the next most likely token or word until some predetermined endpoint is reached. This extended text may then form the completed reply and be sent back to the natural language processor and may be relayed on as a reply 309, which may also be in the form of natural language text.

An example of such an interaction may occur when the initial query is "What is a chatbot?" This may be converted to a prompt "A chatbot is". When sent to the trained attention-based neural network, the reply may be "A chatbot is a computer program designed to simulate conversation with human users, especially over the Internet".

The architecture of such an attention-based neural network is described in more detail in, for instance, in the paper entitled "Attention Is All You Need" written by A. Vaswani et al. and published in Advances in Neural Information Processing Systems, page 5998-6008. (2017), the contents of which are hereby incorporated by reference in their entirety. The paper introduces the concept of a transformer architecture for neural networks.

In 2020, OpenAI Inc, of San Francisco, CA released a Generative Pre-trained Transformer named GPT-3™. This is a large language model (LLM) that uses a decoder-only transformer model of a deep neural network, which uses attention in place of previous recurrence- and convolution-based architectures. Although the setup code for the LLM neural network may be Python, the neural network may be made functional by training on an extensive amount of text. The LLM neural network's only function is, given an input sequence of tokens or words, to predict the most probable next token of word. Simple as such an operation may appear to be, as a result of the transformer architecture and the large dataset on which it was trained, GPT-3™ produces very convincing, grammatically well-formed, and usually appropriate natural language responses as extensions of the input sequence.

In 2022, OpenAI Inc. released ChatGPT™. This was set up as a generative language AI chatbot, using a more advanced version of GPT-3™ as the trained attention-based neural network. Because of the large amount of data on which the attention-based neural network was trained, ChatGPT™ produces very convincing, grammatically well-formed, and usually appropriate natural language replies to natural language prompts.

However, a generative language AI chatbot such as ChatGPT™ may be expensive and time consuming to train. Estimates are that training ChatGPT™ on approximately 570 G bytes of data took over a month using more than 1000 NVIDIA GPU's and cost well over $10 million in computer related expenses. It may also be expensive to operate once trained. Estimates are that a query to ChatGPT™ may cost more than ten times as much in computer related expenses as a search on a Google search engine.

A further disadvantage of generative language AI chatbots may be that what is essentially their knowledge is effectively stored in their parameters, i.e., in the weights and biases assigned to the various interconnections of the neural network. ChatGPT™ is said to have about 175 billion parameters. If erroneous responses are generated, there may be no simple way to correct them. In contrast, an erroneous response from a request-response AI chatbot may be corrected by a simple update of one easily located entry of a request/response database.

Figure 4:
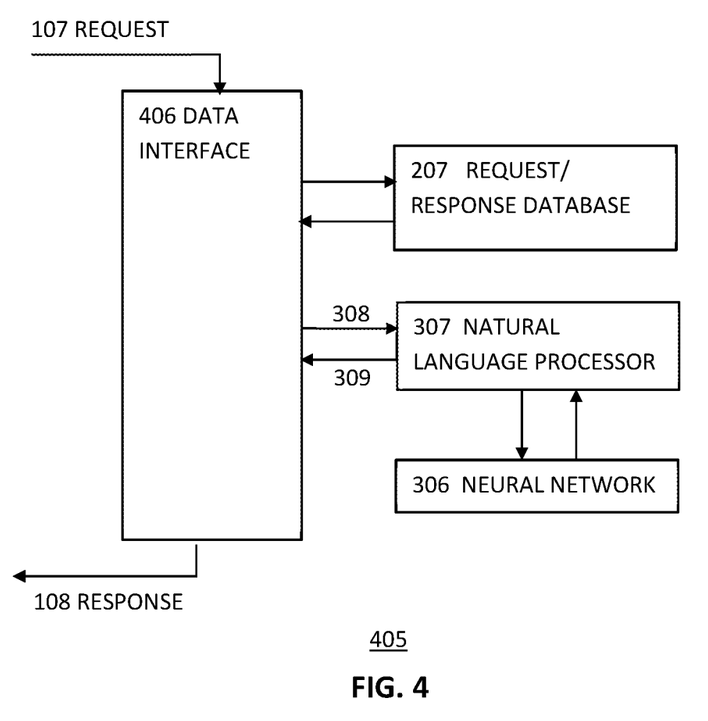
FIG. 4 shows a schematic representation of an automatically trainable AI request processing system.

FIG. 4 shows a schematic representation of an automatically trainable AI request processing system 405.

Such an automatically trainable AI request processing system may effectively be made up of a request-response AI chatbot that is functionally connected to a generative language AI chatbot.

The request-response AI chatbot 205 may, for instance, be comprised of the data interface software module 406 that may receive requests 107, interact with a request/response database 207 and relay responses 108 back to the requesting entity, or some predesignated entity.

The data interface software module may also be programmed to be able to send prompts 308 to, and receive replies 309 back from, the generative language AI chatbot that may be comprised of the natural language processor 307 and the associated trained attention-based neural network 306.

The data interface software module 406 may be implemented using only rules-based computer code. The data interface software module may be programmed to, on receipt of a request, check the functionally connected request/response database to ascertain if the request is a known request. When the request is determined to be a known request, the software module may assume that the associated response that may have been previously stored on the request/response database is valid. The software module may then proceed to output the response to the requesting entity.

However, when the request is determined not to be a known request, the software module may then designate, or convert, the request into a prompt, and send the prompt to the functionally connected generative language AI chatbot.

When the software module receives a reply from the generative language chatbot, it may designate, or convert, the reply into a new, valid response. This new response may then be stored on the request/response database, thereby updating, or training the request-response AI chatbot. The new response may also be output back to the requesting entity as a response.

By repeatedly responding to requests in this manner, the automatically trainable AI request processing system 405 may begin with a request/response database 207 that may be empty, but that, over time, becomes populated with request/response pairs. In the early stages of its use, the automatically trainable AI request processing system 405 may rely heavily on the generative language AI chatbot it is functionally connected to. However, as the system is used, it will need to rely less and less on the generative language AI chatbot. When the population of request/response pairs reaches into the tens or hundreds of millions, the system may become nearly independent of the generative language AI chatbot. Although this may sound like a great deal of request/response pairs, it is estimated that in 2023, voice assisted chatbots such as Amazon™'s Alexa™ and Apple™'s Siri™ were conducting about 3.1 billion searches per month. The 100 million request/responses may only represent as little as 15 gigabytes of data. Random-access memory of this capacity costs approximately $150.00 at 2022 prices, making such an approach both achievable and affordable.

Figure 5:
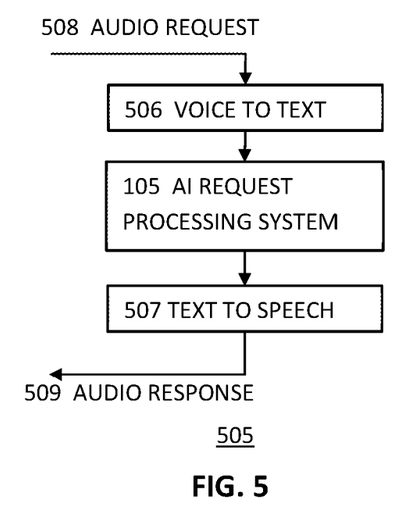
FIG. 5 shows a schematic representation of an audio activated AI request processing system.

FIG. 5 shows a schematic representation of an audio activated AI request processing system 505.

The audio activated AI request processing system may, for instance, be an AI request processing system 105 having access to a voice-to-text software module 506 and a text-to-speech software module 507. In that way an audio request 508 may be converted to a text request and then processed by the AI request processing system as detailed above. Once a response has been formulated by the AI request processing system, it may then be converted into an audio response 509 by the text-to-speech software module 507.

Such an audio activated AI request processing system would resemble and may perform functions equivalent to, or similar to, Siri™ and Alexa™, the well-known virtual assistant technologies developed by Apple Inc. of Cupertino, CA, and Amazon Inc. of Seattle, WA, respectively. Virtual assistants are designed to provide voice-activated assistance and perform various tasks based on user commands or questions. They typically use natural language processing and voice recognition to interpret and respond to user queries or perform actions such as setting reminders, sending messages, making phone calls, providing weather updates, playing music, and more. Both use cloud-based services to process user requests and deliver responses.

Figure 6:
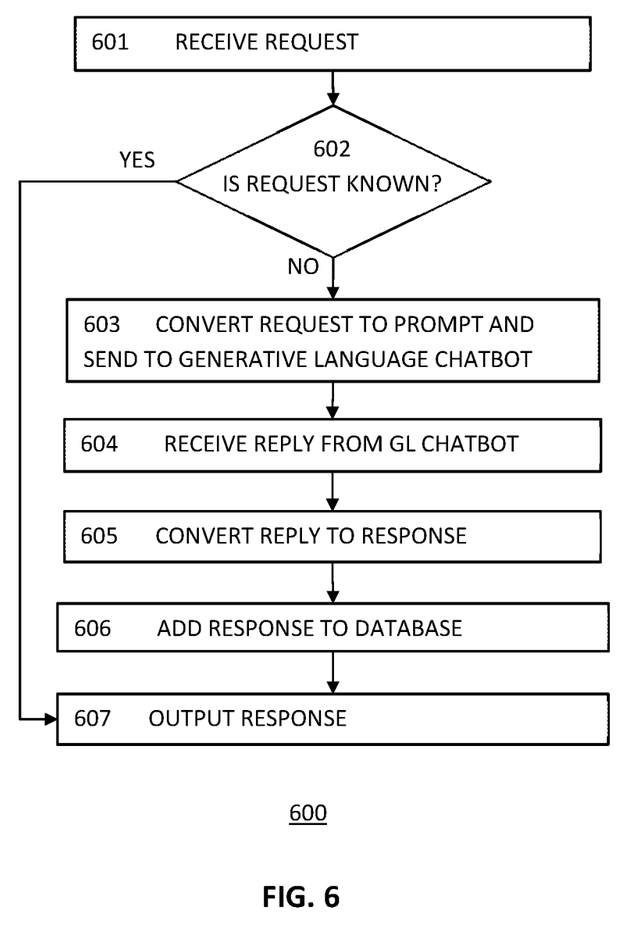
FIG. 6 is a flow diagram showing representative steps in implementing one embodiment of an automatically trainable AI request processing system.

FIG. 6 is a flow diagram 600 showing representative steps in implementing one embodiment of an automatically trainable AI request processing system.

In Step 601 "RECEIVE REQUEST" a request-response AI chatbot that may be a part of an AI request processing system may receive a request. The request may originate from an outside entity and may have been converted into a digital form suitable for electronic digital processing. The request may, for instance, be a natural language question that may originally have been in an audio or text format. Conversion from its original format may have been performed by suitable software modules operative on, or accessed by, the request-response AI chatbot.

In Step 602 "IS REQUEST KNOWN?" the request-response AI chatbot may interact with a database such as, but not limited to, a request/response database in order to see if there is already a database entry corresponding to the request. When such an entry, or one sufficiently like it, exists, the request-response AI chatbot may obtain the response that corresponds to the request and proceed to Step 607 "OUTPUT RESPONSE" and send, or output, the response to the requesting entity. In one embodiment, the responses may all be made up of one or more well-formed, grammatically correct sentences.

Sufficiently like entries may for instance be ones that make the same request but with slightly different wording. For instance, "What is x?", "Explain x" and "Please explain x" may all be considered to be essentially the same request. Classifying requests as "sufficiently like" may, for instance, be accomplished using natural language processing, pattern matching or a look-up table, or some combination thereof.

Natural language sentences, or questions, may be compared for similarity by a variety of methods. While pattern matching may be sufficient in many instances, more sophisticated, well-known approaches to measuring sentence similarity include methods such as, but not limited to, measuring semantic similarity and textural similarity, or some combination thereof. For instance, there are cosine similarity calculators such as SpaCy™, a popular natural language processing library that provides a cosine similarity function that can be used to compute the similarity between two sentences, or questions, based on their word vectors. SpaCy™ is a product of ExplosionAI GmbH, Berlin, Germany.

However, when there is no record in the database that matches, or is a sufficiently close match, to the request, the system may proceed to Step 603 "CONVERT REQUEST TO PROMPT AND SEND TO GENERATIVE LANGUAGE CHATBOT".

In one embodiment of the invention, the system may simply designate the request as a prompt and send it on the functionally connected generative language AI chatbot.

However, the system may first amend the request before sending it on as a prompt.

In one embodiment, when the request is in the form of a question, the amendment may be to convert that request into a prompt that may represent part of the anticipated reply from the generative language AI chatbot. For instance, the request "What is a heat pump?" may be converted into a prompt that is simply "A heat pump is". The generative language AI chatbot may then simply provide the reply as a continuation of the next most probable words that following that seed like prompt. A typical reply may then be "A heat pump is a device that transfers heat from one place to another, typically from a lower-temperature space to a higher-temperature space".

Another reason for making the amendments is that it may be desirable to have all the responses in the database be suitable for a particular category of users such as, but not limited to, people of particular age range, people of a particular gender, people having a particular hobby, people of a particular cognitive ability, people of a particular educational level, people belonging to a particular organization, people of a particular location, or nationality, people of a particular ideological basis, people of a particular faith or religious orientation, or some combination thereof. Suitable wording may then be appended to, or added to, the request before sending it on as a prompt.

For instance, a request may be a simple question such as, but not limited to, "What is a chatbot?". An amended prompt may then be formed by adding additional natural language to make the reply suitable for a particular level of comprehension. For instance, a suitable prompt may be "Please answer the following question in language suitable for a US sixth grader "what is a chatbot?"".

Another reason for amending, or adding to, the request before sending it as a prompt may be to limit the size of the reply. The system may, for instance, desire that replies from the generative language AI chatbot are all of a certain size, such as, but not limited to, less than 50 words, a single sentence, a single paragraph, or some combination thereof.

A suitable prompt may then, for instance, be "Please answer the following question in a single paragraph "what is a chatbot?"".

In Step 604 "RECEIVE REPLY FROM GL CHATBOT" a reply may be received from the generative language AI chatbot. The reply is typically in a digital format and may be representative of a convincing, grammatically well-formed, appropriate, and usually accurate, natural language reply to the natural language prompt.

In Step 605 "CONVERT REPLY TO RESPONSE" the system may simply designate the reply received from the generative language AI chatbot as the response. However, it may be desirable to edit the reply before designating it as the response to the request. For instance, it may be desirable to have replies that are limited to a certain length, such as, but not limited to, a maximum length of 50 words, a length of a sentence, a length of a paragraph, or some combination thereof. It may also be desirable to have responses that all contain one or more natural language sentences that are well-formed and grammatically correct.

Such editing may, for instance, be accomplished automatically using well-known pattern matching algorithms, including the so-called brute-force algorithm that checks each position in the reply for a possible occurrence of one or more characters such as, but not limited to, a space for counting words, a full stop for finding the end of a sentence, a character return for finding the end of a paragraph.

In Step 606 "ADD RESPONSE TO DATABASE" once the reply has been designated as, or edited into, an acceptable response, that response may be added to the functionally connected request/response database as the response that corresponds to, or is associated with, the request. In this way the database may be expanded, and the request-response AI chatbot may be effectively trained. The system may then proceed to Step 607 "OUTPUT RESPONSE", and send the newly obtained response to the requesting entity.

In a further embodiment of the present invention, in Step 603 "CONVERT REQUEST TO PROMPT AND SEND TO GENERATIVE LANGUAGE CHATBOT", the system may elect to delay sending the prompt to the generative language AI chatbot. This delay may, for instance, be so as to obtain favorable rates on the cost of computing time. If the request is not urgent, the delay may be of a significant amount of time such as, but not limited to, at least an hour or even overnight.

Figure 7:
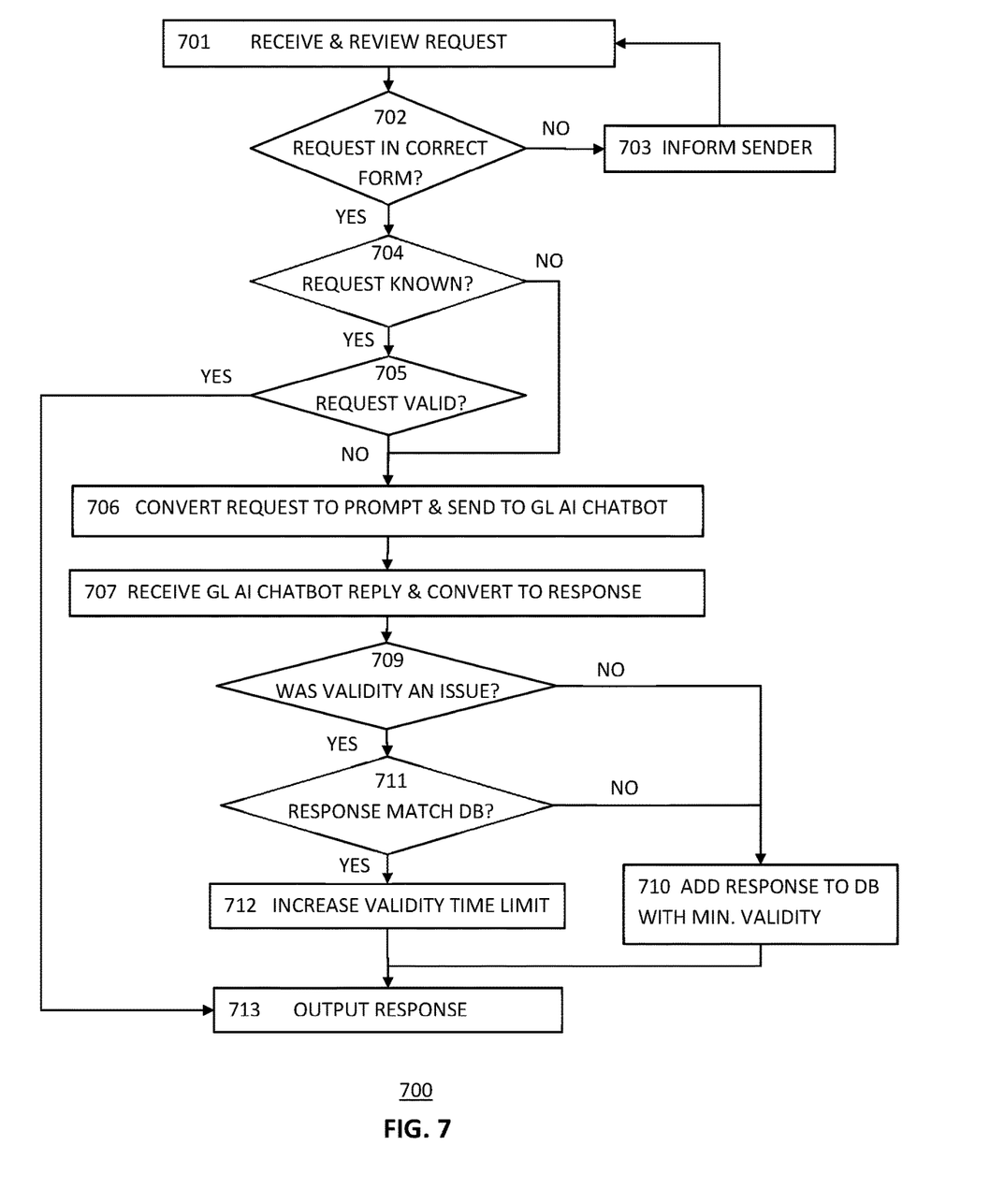
FIG. 7 is a flow diagram showing representative steps in implementing a further embodiment of an automatically trainable AI request processing system.

FIG. 7 is a flow diagram showing representative steps in implementing a further embodiment of an automatically trainable AI request processing system.

In this embodiment, the automatically trainable AI request processing system may begin with Step 703 "RECEIVE & REVIEW REQUEST". In this step, the system may not only receive a request, but may also review that request to check that it is in a correct or required form. The required form may, for instance, include a requirement such as, but not limited to, that the request is in a particular natural language, that the request is grammatically well formed. The required form may also, or instead, specify that the request is of a particular size such as, but not limited to, a single sentence, a single paragraph, that it has less than a predetermined number of words, or some combination thereof. In one embodiment the required form may be that the request is in the form of an English language question in which the first word of the request is a predefined key word. The predefined keyword may, for instance, be a word selected from what Rudyard Kipling, in a well-known poem, referred to as his "Six Honest Serving Men", i.e., What, Why, When, How, Where and Who. In a further embodiment, the list of permissible, or required, key words, may further include the words did, does, can, and could. Having such a constraint on the first word of a request may, for instance, be useful in constructing a simplified automatically trainable AI request processing system that may, for instance, act as a simplified version of Wikipedia™.

The request may also or instead be reviewed for objectionable content, such as, but not limited to, offensive language or offensive content. Such objectional content may be rejected or revised.

Step 702 "REQUEST IN CORRECT FORM?" is the step in which the automatically trainable AI request processing system checks to see if a received request is in the correct or required form. If it is determined that the request is incorrectly formed, the system may proceed to Step 703 in which the sender of the request may be informed that the request is not in the correct form. The system may also inform the sender of the requirements for a correctly formed request. At this juncture, the system may revert back to Step 701 and wait for a next request, having performed no further processing on the current, ill-formed request.

If the request is determined to be in a correct or appropriate form, the system may then move on to Step 704 "REQUEST KNOWN?". In this step, the system may check the associated Request/Response database to determine whether or not there is already a matching request stored there. Checking for a matching request may, for instance, be preformed using methods of determining sentence or question similarity detailed above.

If the system determines that there is a matching request, then the system may proceed to Step 705 "REQUEST VALID?". In this step, the system may check to see if an associated response is valid. Validity may, for instance, be related to, or equated with, the age of the response, i.e., how long a time it is since the response was recorded on the request/response database. A determination of a response's validity may, therefore, be accomplished by checking an associated expiration date or validity time limit associated with the particular response. Such data may also be stored in the request/response database. This associated validity time limit may, for instance, be a date or time beyond which the response may not be considered a valid response. The validity may then be determined by comparing the current date and/or time with the expiration date and/or time. The expiration date or time may, for instance, be dependent upon the type of response. Weather related responses may, for instance, only be valid for a short period of time, such as, but not limited to, a number of hours, or a small number of days. Similarly, current affairs responses may only be considered valid for a short period of time, such as a number of days or even several weeks. Conversely historical responses may be considered valid for a longer period of time such as a year. The validity date may also, or instead, be determined by a suitable incremental data retention strategy as described in more detail below.

If the system determines both that the request is known and that the response is still valid, the system may then proceed to Step 713 "Output Response". In this step the system may send the corresponding, or associated, response found in the request/response database back to the entity making the request.

If, however, the response was determined not to be a known response or that it is no longer a valid response, the system may proceed to Step 706: "CONVERT REQUEST TO PROMPT & SEND TO GL AI CHATBOT". In this step the system may convert the request into a prompt in a suitable format for sending to a generative language AI chatbot.

This conversion or amendment of the request may include actions such as, but not limited to, adding additional language so that the reply from the generative language AI chatbot may be of a particular type. Such a particular type of reply may, for instance, include a reply size limitation such as, but not limited to, that the reply be a single sentence, a single paragraph, or less than a predetermined number of words, or some combination thereof. Or it may be a requirement that the reply be of a particular form or style, such as, but not limited to, written for a certain level of comprehension, or to be in the style of a known author, or in a particular voice such as a passive or active voice or some combination thereof. The requirement may also be that the reply is in a natural language, that it is well-formed and grammatically correct.

In Step 707 "RECEIVE GL AI CHATBOT REPLY & CONVERT TO RESPONSE", the system may receive a reply from the generative language AI chatbot. The system may then convert, or amend, the reply to place it in a form corresponding to that of the responses stored on the request/response database. The conversion may, for instance, be to adjust the size of the response to be a single sentence, a single paragraph or to be less than a predetermined number of words, or some combination thereof. The conversion may also be to ensure that the response is well-formed and grammatically correct. The conversion may also, or instead, ensure that the response is in a particular voice, such as, but not limited to, a passive or active voice.

The system may then proceed to Step 709 "WAS VALIDITY AN ISSUE?", the system may then check to see the reason the prompt was sent to the generative language AI chatbot. If validity was not an issue, i.e., that the reason was that the request was deemed to be unknown, then the system may proceed to Step 710 "ADD RESPONSE TO DB WITH MIN. VALIDITY". In this step, the system may add the response to the request/response database. It may also associate the new response with a minimum validity. This may, for instance, be accomplished by adding validity data, such as, but not limited to, an expiration date or an associated validity time limit, which may, for instance, be a minimally allowed, or initial validity time limit. This may, for instance, be a date that is a predetermined number of days from the current date. In a further embodiment, the minimum, or initial starting, value may depend on the type of request.

Weather related requests may, for instance, have a shorter minimum validity time limit than requests for historical, scientific, or technical requests.

If, however, validity was determined to be the reason the prompt was sent to the generative language AI chatbot, i.e., the request was known, but was associated response was determined not to be a valid response, then the system may proceed to Step 711 "RESPONSE MATCH DB?". In this step the system may compare the response just received, derived from the generative language AI chatbot reply, and see if it matches, or is essentially the same as the response previously associated with the request in the request/response database.

Natural language sentences such as the responses may be compared for similarity by a variety of methods. While the pattern matching of the texts may be sufficient in many instances, more sophisticated, well-known approaches to measuring sentence similarity include methods such as, but not limited to, measuring semantic similarity and textural similarity, or some combination thereof. For instance, there are cosine similarity calculators such as SpaCy™, a popular natural language processing library that provides a cosine similarity function that can be used to compute the similarity between two sentences based on their word vectors. SpaCy™ is a product of ExplosionAI GmbH, Berlin, Germany.

If the associated and new responses are determined to be a match, or sufficiently similar, the system may proceed to Step 712 "INCREASE VALIDITY TIME LIMIT".

In step 712, the system may increase the validity time limit. For instance, in one embodiment of the present invention, all responses may initially be associated with a minimum validity time limit. This may, for instance, be a date that is set to be a length of time forward from the date the response is initially stored. The initial length of time may, for instance, be one day. When the system comes to increment the validity time limit, the increment may be by an amount that is a multiple of the initial increment.

For instance, the initial length of validity may be one day. The first time the response is confirmed to be a match, the new length of validity may then be incremented to four days, the next time to sixteen days and so on up to a maximum that may for instance be a year. In such an embodiment, each response may be associated both with a validity date and an increment level, i.e., a specific end date and increment level such as 12/10/2023; 1. Next time around that might be set to 12/15/2023; 4. In such an implementation the number, or increment level, associated with the date may represent the number of days of validity by which the previous date was extended. Or it may simply represent a level of increment such as 1 representing a single day, a 2 representing a second level of incrementation that may be a predetermined multiple such as 4. In this way, the level numbers 1, 2, 3, 4 may represent prior increments in an increment ladder such as 1, 4, 16, 64, time units such as, but not limited to, days, hours, seconds, years, or some combination thereof.

One of ordinary skill in the art may appreciate that such an algorithmic strategy may be implemented with a wide variety of time intervals, increment ladders and maximum increments that may be selected based on the application of the automatically trainable AI request processing system.

In such an incremental response retention strategy, the validity time limit, and the degree of incrementation may be stored along with the response in the request/response database.

In a further embodiment, when the associated response and the new response are determined to be essentially the same, the new validity time limit may be set to a difference between a current date and a date on which the new validity time limit was last, or previously, set. In this way a response to an infrequently asked question that has long validity such as, but not limited to, a question on a relatively obscure but settled question of history, may not have to be sent on to the generative language AI chatbot each time the question is asked.

Or the validity time limit may be set to the longer of that determined by either an algorithmic strategy, or one determined by a difference in dates.

Or the validity time limit may be set by a combination in with the difference in dates may be an integral part of the algorithm strategy. For example, the increment may be by an increasing multiple, or fraction, of the difference in dates.

The appropriate data for further setting of the validity time limit may be stored in the request/response database along with the associated response.

Once the validity time limit has been determined and stored on the request/response database, the system may then proceed to Step 713 "OUTPUT RESPONSE". In this step, which may also be reached after Step 710, the system may send the response back to the entity making the request.

In a yet further embodiment of the present invention, the request-response AI chatbot may be intended as a tutoring assistant. In such a case, the reply from the generative language AI chatbot may, for instance, be editing into two or more segments, each of which may represent steps in solving a problem. These segments may then be stored in the database as the components of a structured reply and only one of the components may be output as an initial response.

One further advantage of request-response AI chatbots may be that the associated request/response database may have multiple responses for each request, and one or more of the multiple responses may be sponsored responses. For instance, a request for how a heat pump works, may also have one or more sponsored responses that may, for instance, be URLs of heat pump suppliers. In one embodiment, the response may have the official, factual response returned along with one or more of the sponsored responses. In this way, the system may be monetized by payments from sponsors. In a further embodiment, the sponsored response may be independent of the factual response, and may simply be a sponsored advertising link. It may be triggered simply randomly, or it may be linked to demographic factors related to the requesting entity such as, but not limited to, age, gender, geographic location, ethnicity, or some combination thereof. It may also or instead be linked to the requesting entities prior internet usage such as, but not limited to, social media postings, purchasing history, search history or some combination thereof.

One of ordinary skill in the art may appreciate that the components of the automatically trainable AI request processing system may all be implemented on a single platform, or server, that may reside at a single location, or one or more of the components may be distributed over a variety of platforms, or servers, some or all of which may operate in the so-called "cloud", i.e., a network of remote servers that are hosted on the Internet and used to store, manage, and process data. The cloud may provide on-demand access to computing resources and services, including storage, databases, applications, and computational power, that may be used to implement a part or all of the automatically trainable AI request processing system.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A method for automatically training an AI request processing system, comprising:
   providing a request-response AI chatbot, said request-response chatbot having been implemented using only rules-based computer code;
   providing a functional connection to a generative language AI chatbot, said generative language AI chatbot comprising a trained pre-trained attention-based neural network;
   receiving, by said request-response chatbot, a request;
   checking, by said request-response chatbot, a functionally connected request/response database to ascertain whether said request is a known request;
   when said request is determined to be a known request, checking to ascertain whether an associated response is valid;
   when said associated response is determined to be both associated with a known request and valid, outputting said associated response;
   when said request is determined not to be a known request or said associated response is determined not to be valid:
   forming a prompt comprising said request;
   sending said prompt to said functionally connected generative language AI chatbot;
   receiving a reply from said generative language chatbot;
   converting said reply into a new response;
   when said associated response was determined to not be valid, further comparing said new response with said associated response, and,
   when said new response and said associated response are determined to be essentially the same, setting a new validity time limit having a value greater than a validity time limit previously associated with said response;
   when said response and said associated response are determined not to be essentially the same, replacing said associated response with said new response and setting said new validity time limit to a predetermined minimum value;
   storing said new response as a valid response on said request/response database; and,
   outputting said new response.

2. The method of claim 1, wherein, when said associated response and said new response are determined to be essentially the same, setting said new validity time limit to a multiple of said associated validity time limit, up to a preset maximum value.

3. The method of claim 2, wherein, when said associated response and said new response are determined to be essentially the same, setting said new validity time limit to a difference between a current date and a date on which said validity time limit was last set.

4. The method of claim 1 further comprising checking whether said request is a well-formed request.

5. The method of claim 4, wherein, said well-formed request has a predefined key word as a first word, said key word being one of what, which, why, how, who and when, or their equivalent in another language.

6. The method of claim 1, wherein, said prompt is constructed so as to limit said reply from said generative language AI chatbot to be of a predetermined length selected from one of a sentence, a paragraph, and a predetermined number of words.

7. The method of claim 1, wherein, said prompt is constructed such that said reply from said generative language AI chatbot is written for a certain level of comprehension.

8. The method of claim 1, further comprising outputting a second, sponsored response comprising one or more URL's associated with said request.

9. The method of claim 1, further comprising functional access to a voice-to-text software module; and, when said request is an audio request, said request-response AI chatbot is further programmed to convert said audio request to a text request using said voice-to-text software module.

10. The method of claim 1, further comprising functional access to a voice-to-text software module; and, said request-response AI chatbot is further programmed to convert said response to an audio format using said text-to-speech software and output an audio response.

11. An automatically trainable AI request processing system, comprising:
a request-response AI chatbot, said request-response AI chatbot having been implemented using only rules-based computer code;
a functional connection to a generative language AI chatbot, said generative language AI chatbot comprising a trained pre-trained attention-based neural network; and,
wherein, said request-response AI chatbot is programmed to perform the functions of:
receiving a request;
checking a functionally connected request/response database to ascertain whether said request is a known request;
when said request is determined to be a known request, checking to ascertain whether said known request is a valid request;
when said associated response is determined to be associated with a known request and is determined to be valid, outputting said associated response;
when said request is determined to not be a known request or said associated response is determined not to be valid:
forming a prompt comprising said request;
sending said prompt to said functionally connected generative language AI chatbot;
receiving a reply from said generative language chatbot;
converting said reply into a new response;
when said associated response was determined not to be a valid response, said request-response AI chatbot is further programmed to compare said new response with said associated response, and,
when said new response and said associated response are determined to be essentially the same, setting a new validity time limit to a value greater than an associated validity time limit originally associated with said associated response; and
when said new response and said associated response are determined not to be essentially the same, setting said new validity time limit to a predetermined minimum value; and,
replacing said associated response with said new response;
storing said new response as a valid response on said request/response database; and,
outputting said new response.

12. The system of claim 11, wherein, when said new response and said associated response are determined to be essentially the same, setting said new validity time limit to a multiple of said associated validity time limit, up to a preset maximum value.

13. The system of claim 11, wherein, said request-response AI chatbot is further programed to check whether said request is a well-formed request.

14. The system of claim 13, wherein said well-formed request has a predefined key word as a first word.

15. The system of claim 11, wherein, said prompt is constructed to limit said reply from said generative language AI chatbot to be of a predetermined length selected from one of a sentence, a paragraph, and a predetermined number of words.

16. The system of claim 11, wherein, said prompt is constructed such that said reply from said generative language AI chatbot is written for a certain level of comprehension.

17. The system of claim 11, further comprising outputting a second, sponsored response comprising one or more URL's associated with said request.

18. The system of claim 11, further comprising functional access to a voice-to-text software module; and, wherein, said request-response AI chatbot is further programmed such that when said request is an audio request, said audio request is automatically converted to a text request; and, said response is automatically converted into an audio format and output as an audio response.

* * * * *